United States Patent [19]

Sakakiyama et al.

[11] 4,449,617
[45] May 22, 1984

[54] ELECTRO-MAGNETIC CLUTCH CONTROL SYSTEM FOR AUTOMOBILES

[75] Inventors: Ryuzo Sakakiyama; Toshio Takano, both of Tokyo, Japan

[73] Assignee: Fuji Jukogyo Kabushiki Kaisha, Tokyo, Japan

[21] Appl. No.: 276,325

[22] Filed: Jun. 22, 1981

[30] Foreign Application Priority Data

Jul. 16, 1980 [JP] Japan .................. 55-97360

[51] Int. Cl.³ .................. F16D 43/22; F16D 27/00
[52] U.S. Cl. .................. 192/0.033; 192/0.076; 192/21.5
[58] Field of Search .................. 192/0.033, 21.5, 0.076, 192/103 R

[56] References Cited

U.S. PATENT DOCUMENTS

| 2,761,538 | 9/1956 | Jaeschke | 192/21.5 |
| 2,916,944 | 12/1959 | Diesfeld | 192/0.076 |
| 3,402,793 | 9/1968 | Scholl | 192/0.033 |
| 4,172,505 | 10/1979 | Rabus et al. | 192/0.076 |
| 4,364,459 | 12/1982 | Futchally | 192/0.033 |

Primary Examiner—Ernest R. Purser
Attorney, Agent, or Firm—Martin A. Farber

[57] ABSTRACT

A system for controlling an electro-magnetic clutch of an internal combustion engine mounted on a car, which has a drive member secured to a crankshaft of the internal combustion engine, a magnetizing coil provided in the drive member, a driven member adjacent the drive member, and a transmission secured to the driven member. An engine speed detecting circuit is provided for producing an output when the engine speed exceeds a predetermined speed in an accelerating condition, the output signal being retained until the engine speed falls below a speed different from the predetermined speed. A gate is responsive to the output of the engine speed detecting circuit for producing an output which is applied to a switching transistor. The transistor is turned on by the output, so that a rated current passes through the magnetizing coil for engaging the clutch.

18 Claims, 8 Drawing Figures

ELECTRO-MAGNETIC CLUTCH CONTROL SYSTEM FOR AUTOMOBILES

BACKGROUND OF THE INVENTION

The present invention relates to a system for controlling an electro-magnetic clutch for an internal combustion engine mounted on a car.

An electro-magnetic powder clutch is a known type electro-magnetic clutch. The electro-magnetic powder clutch comprises an annular drive member secured to the crankshaft of an engine, a magnetizing coil provided in the drive member, a driven member secured to the input shaft of a transmission spaced from and leaving a small gap from the drive member, magnetic powder provided therein, and a shift lever for changing the gears in the transmission. The shift lever is provided with a switch for the magnetizing coil, which is actuated by operating the shift lever. When the shift lever is shifted to the gear engaging position, the switch is closed so that electric current flows through the magnetizing coil to magnetize the drive member. As the accelerator pedal is depressed, the current applied to the coil increases. The magnetic powder is aggregated in the gap between the drive member and the driven member, so that the driven member is coupled to the drive member. The clutch current passing through the magnetizing coil is progressively increased according to the degree of depression of the accelerator pedal, while the clutch slips between the drive member and the driven member until the clutch current reaches the rated current. Thus, the car may be started by depressing the accelerator pedal without operating clutch pedal.

In order to smoothly start the car, it is necessary to detect the speed of the car and to control the clutch current according to the speed. In a system to meet such a requirement, a speed sensor is provided to generate a signal when the car speed exceeds a predetermined level. The system should be designed such that the clutch slips during low speed below the predetermined speed under the accelerating condition of the engine and the clutch perfectly engages when the car speed reaches the predetermined speed. Generally, the speed sensor is provided in the speedometer. In the system employing such a speed sensor, there is the disadvantage that when the car is decelerated at a speed below the predetermined speed, the braking action of the engine does not occur because of the disengagement of the clutch. Further, if the speedometer cable is broken, the speed sensor does not work. Therefore, if the speed sensor does not work in a deceleration condition, the circuit of the clutch coil is interrupted so that the clutch disengages. As a result, the braking action of the engine does not occur.

SUMMARY OF THE INVENTION

The object of the present invention is to provide a system which controls the clutch current according to the engine speed, whereby the advantage of the braking action of the engine may be surely taken at every transmission ratio of the transmission.

According to the present invention, there is provided a system for controlling an electro-magnetic clutch for an engine powered car, which has an accelerator pedal, ignition device for said engine, magnetizing coil for coupling said electro-magnetic clutch, comprising an acceleration detecting circuit responsive to the depression of said accelerator pedal for producing an output signal, an engine speed detecting circuit adapted to produce an output signal when the engine speed exceeds a predetermined speed, the output signal being retained until the engine speed falls below a speed different from the predetermined speed, means for producing an output for increasing the current passing through said magnetizing coil, gate means responsive to outputs of said acceleration detecting circuit and said means for producing a first output for increasing the current passing through said magnetizing coil and further responsive to said output of said engine speed detecting circuit for producing a second output for a rated current of said magnetizing coil, and switch means provided in the circuit of said magnetizing coil and responsive to outputs of said gate means for allowing the current to pass through said magnetizing coil.

BRIEF DESCRIPTION OF DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENTS

Figure 1:
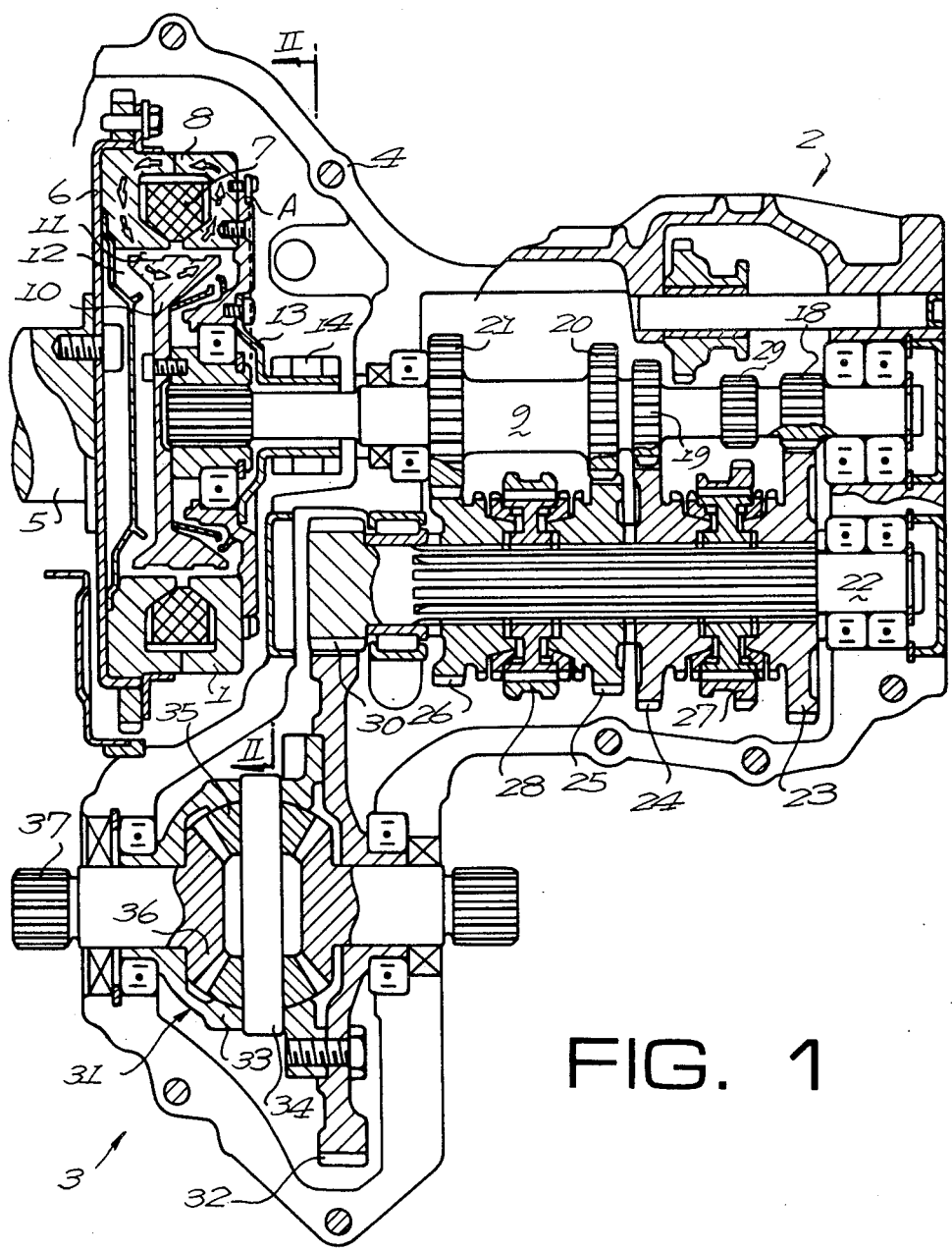
FIG. 1 is a cross-sectional view of an electro-magnetic powder clutch used in a system according to the present invention.
Figure 2:
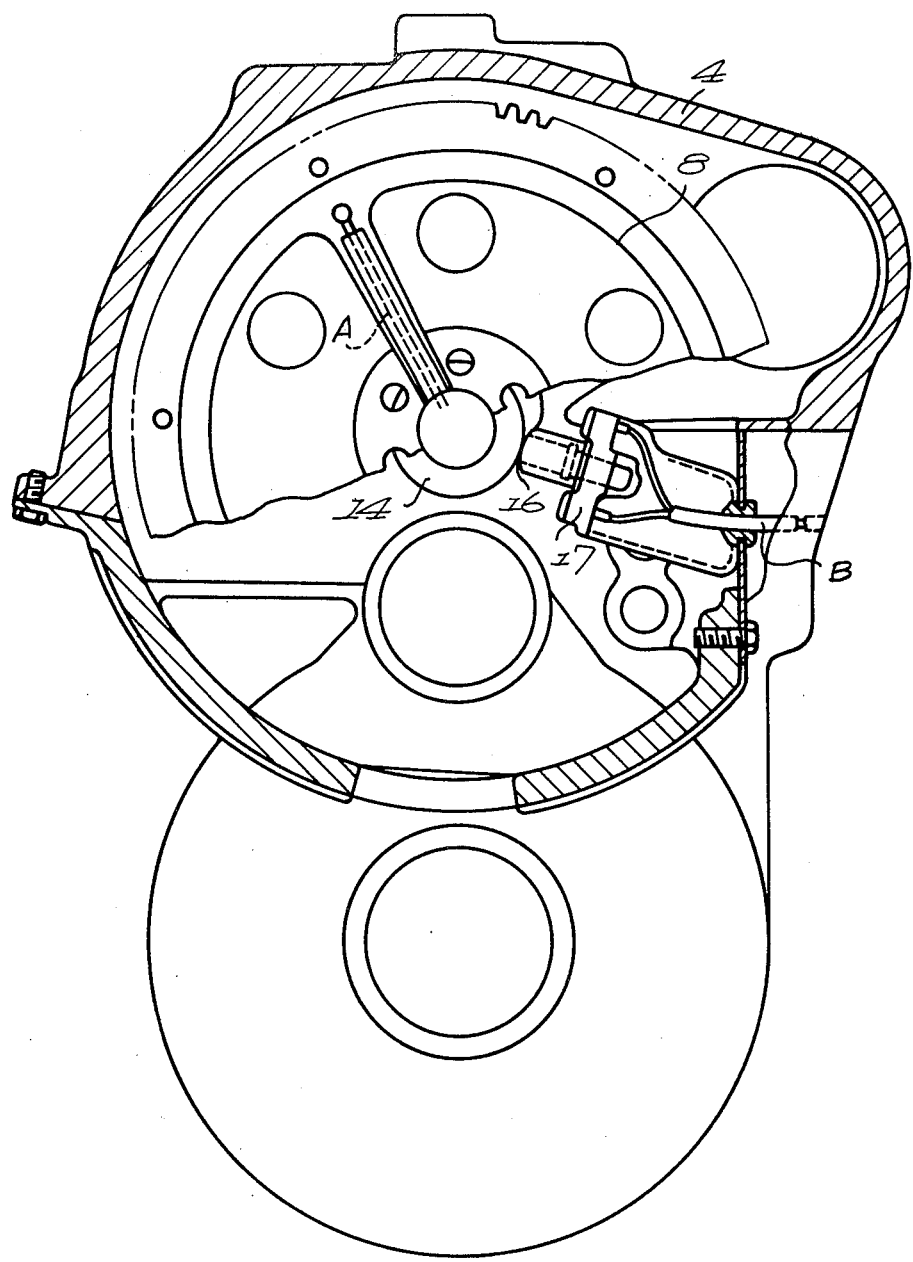
FIG. 2 is a cross-section taken along line II—II of FIG. 1.

Referring to FIGS. 1 and 2 showing a transmission to which the present invention is applied, is an electro-magnetic powder clutch 1 is operatively connected to a four-speed transmission 2 which is connected to a final reduction device 3.

The electro-magnetic powder clutch 1 is provided in a clutch case 4 and comprises a drive plate 6 attached to the end of a crankshaft 5 of an internal combustion engine, an annular drive member 8 secured to the drive plate 6, a magnetizing coil 7 provided in the drive member 8, and a driven member 10 secured by a spline engagement to an input shaft 9 of the transmission 2, spaced from and leaving a gap 11 from the drive member 8. Magnetic powder is provided in a powder chamber 12 and the gap 11 is adapted to be filled with the powder during operation. A cap 13 is secured to the drive member 8. The cap 13 has a cylindrical portion coaxial with the input shaft 9, to which slip rings 14 are secured. The slip rings 14 are connected to the drive member 8 by a lead A. Brushes 16 pressed against slip rings 14 are supported in a holder 17 and connected to a hereinafter described control means by a lead B.

In such a construction, the drive plate 6 and the drive member 8 rotate together with the crankshaft 5 and the magnetic powder sealed in the powder chamber 12 is drawn to the inner surface of the drive member 8 by centrifugal force. If the magnetizing coil 7 is excited by current applied through the lead B, the brushes 16, the slip rings 14 and the lead A, the drive member 8 is magnetized to produce a magnetic flux passing through the driven member 10. Thus, the powder is aggregated in the gap 11, so that the powder of the engine is transmitted to the input shaft 9 through the clutch.

In the transmission 2, 1st to 4th speed drive gears 18 to 21 are integrally provided on the input shaft 9. The drive gears 18 to 21 are engaged with driven gears 23 to 26, respectively. Driven gears 23 to 26 are rotatably mounted on an output shaft 22 parallel to the input shaft 9. Each of the driven gears 23 and 24 is adapted to be engaged with the output shaft 22 by operating a synchromesh mechanism 27 and each of the driven gears 25 and 26 is engaged with the output shaft 22 by a synchromesh mechanism 28 in a well known manner. Further, a reverse drive gear means 29 is provided. Thus, by operating the shift lever (not shown) of the transmission, the driven gear 23 is coupled integrally with the output shaft 22 by the synchromesh mechanism 27 and the 1st speed is obtained on the output shaft 22 because the speed of the output shaft 9 is greatly decreased, and the 2nd, 3rd and 4th speed may be respectively obtained accordingly.

Further, provided on an end of the output shaft 22 is an output gear 30 which engages with a ring gear 32 in a differential 31 of the final reduction device 3 to transmit the output of the output shaft 22 of the transmission 2 directly from the ring gear 32 to a side gear 36 through a case 33, a spider 34 and a pinion 35, and further to driving wheels of the car through wheel shaft 37.

Figure 3:
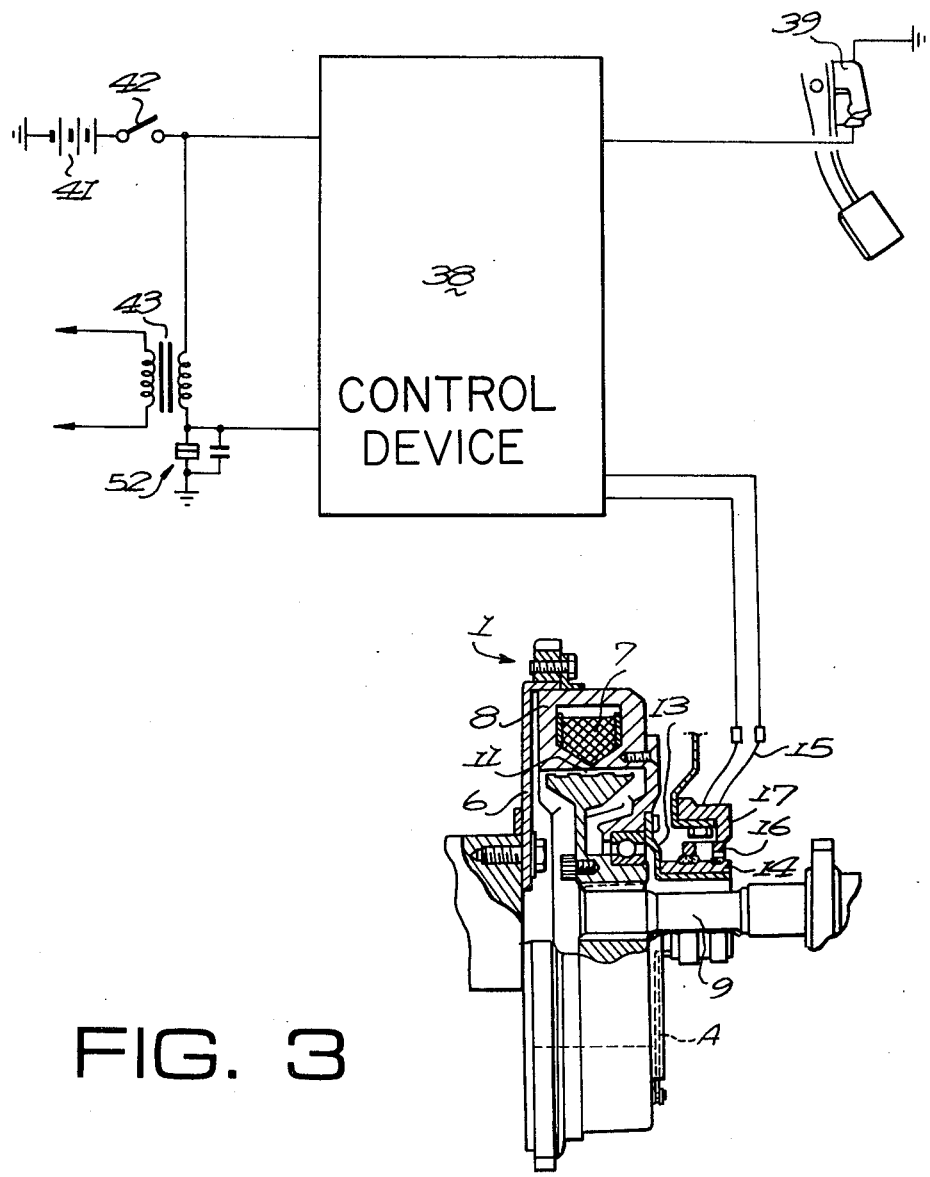
FIG. 3 is a schematic view showing an embodiment of the present invention.

Referring to FIG. 3, a control device 38 is provided for controlling the clutch current, an acceleration switch 39 which is opened by depressing the accelerator pedal. A voltage is supplied from a battery 41 to the control device 38 through a key switch 42.

A primary winding of an ignition coil 43 is connected to a contact breaker 52 and to the control device 38 for supplying pulses caused by the ignition to the device. The output of the control device 38 is connected to the coil 7 through leads 15.

Figure 4:
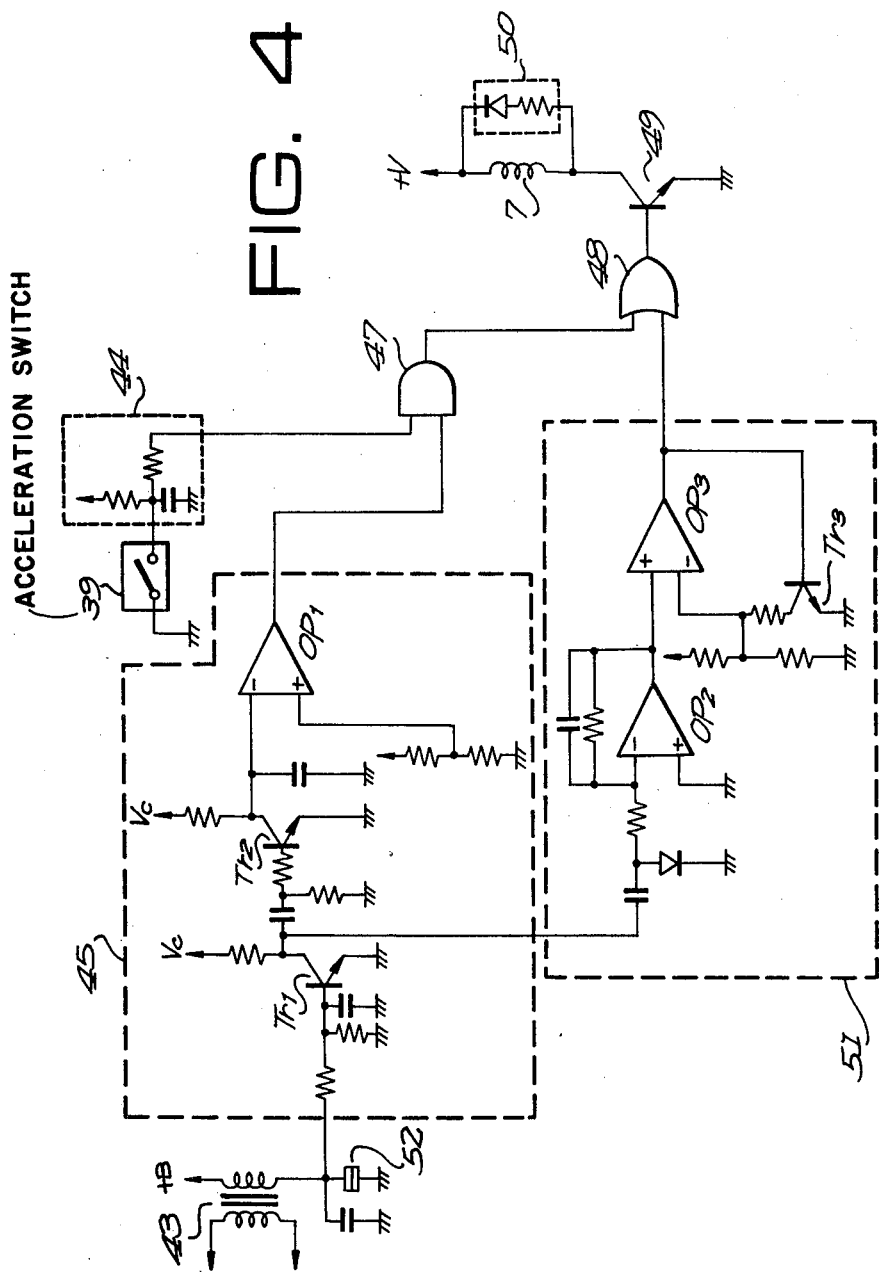
FIG. 4 is an electronic circuit of a control device of the present invention.

Referring to FIG. 4, the acceleration switch 39 is connected to an acceleration detecting circuit 44, the output of which is connected to an input of an AND gate 47. The negative terminal of the primary winding of the ignition coil 43 is connected to a pulse generating circuit 45 which comprises transistors $Tr_1$ and $Tr_2$ and an operational amplifier $OP_1$. The output of the operational amplifier $OP_1$ is connected to the AND gate 47. The output of the transistor $TR_1$ is connected to the engine speed detecting circuit 51. The engine speed detecting circuit 51 comprises an operational integrator $OP_2$ and an operational amplifier $OP_3$. Outputs of the AND gate 47 and the operational amplifier $OP_3$ are connected to an OR gate 48. The output of the OR gate 48 is connected to a base of a transistor 49 which is connected to the coil 7 in series. A commutation circuit 50 is connected to both ends of the coil 7.

Figure 5:
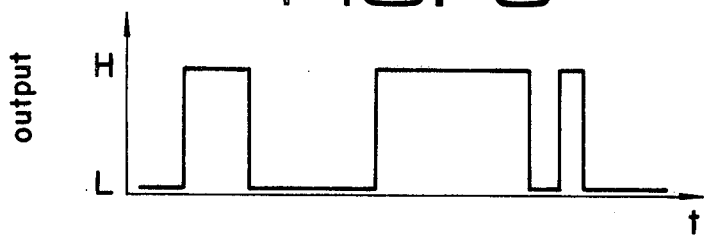
FIGS. 5 to 7 are output waveforms at various portions of the circuit of FIG. 4.

FIG. 5 shows waveforms of the output of the acceleration detecting circuit 44. The output is at a high level when the acceleration switch 39 is opened by the depression of the accelerator pedal, and at a low level when the pedal is released.

Figure 6:
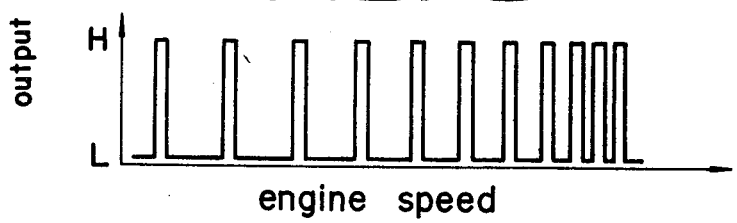

FIG. 6 shows the output of the pulse generating circuit 45. The pulse width is constant and the pulse separation or period decreases with an increase of the engine speed that is the pulse duty factor increases with an increase in the engine speed.

Figure 7:
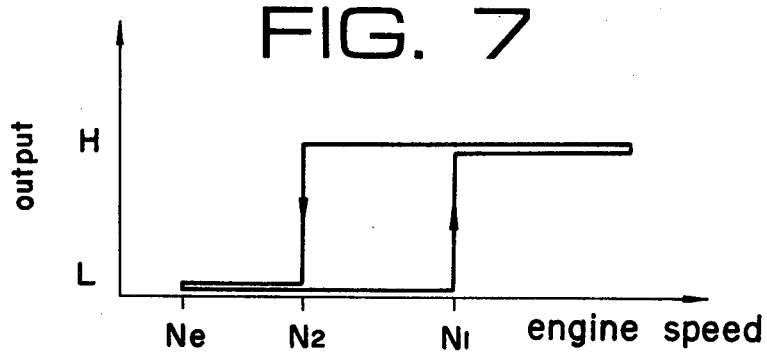

FIG. 7 shows the output of the engine speed detecting circuit 51. When the engine speed reaches a predetermined speed $N_1$, the output of the operational integrator $OP_2$ exceeds the level of the inverting input of the operational amplifier $OP_3$. Thus, the output of the operational amplifier $OP_3$ goes to a high level. A transistor $TR_3$ is turned on by the high level output of the operational amplifier. Accordingly, the level of the inverting input of the operational amplifier $OP_3$ is decreased. Therefore only when the engine speed decreases to another lower predetermined speed $N_2$, which means that the output of the operational integrator $OP_2$ decreases to the lowered level of the inverting input of the operational amplifier $OP_3$, the output of the amplifier $OP_3$ changes to a low level.

Figure 8:
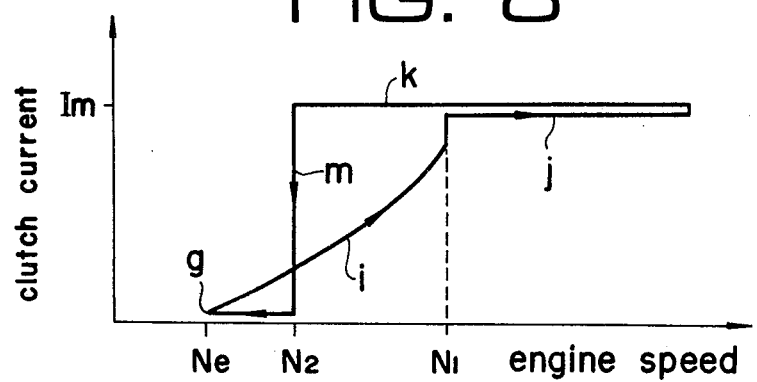
FIG. 8 is a graph illustrating the relationship between the clutch current and the engine speed.

As the accelerator pedal is depressed when the car is standing still, the engine speed correspondingly rises. When the engine speed is lower than the set speed $N_1$, the output of the engine speed detecting circuit 51 is at a low level. Therefore, the output of the OR gate 48 depends on only the output of the AND gate 47. The output of the AND gate 47 has a waveform in proportion to the output of the pulse generating circuit 45. Therefore, the pulse separation of the output pulses of the AND gate 47 decreases with an increase of the engine speed. Since the transistor 49 is intermittently turned on by the output pulses of the AND gate 47, the clutch current passing through the coil 7 increases from "g" of FIG. 8 with an increase of the engine speed as shown by "i". During the intermittent excitation of the coil 7, the clutch slips, whereby the car can be smoothly started. When the engine speed rises to the set speed $N_1$, the output of the engine speed detecting circuit 51 goes to a high level. Therefore, the output of the OR gate 48 changes to a constant high level. Thus, a rated clutch current "j" flows through the coil 7, so that the clutch perfectly engages.

When the accelerator pedal is released for deceleration, the output of the acceleration detecting circuit 44 goes to a low level. Accordingly, the output of the AND gate 47 goes to a low level. However, until the engine speed decreases to the set speed $N_2$, excitation of the coil 7 is maintained by the output of the engine speed detecting circuit 51 as shown by "k". Thus, the braking action of the engine is effected. When the engine speed reaches the set speed $N_2$, the output of the engine speed detecting circuit 51 goes to a low level and hence the output of the OR gate 48 changes to a low level. Thus, the transistor 49 is turned off to de-energize the coil 7 as shown by "m", so that the clutch is disengaged.

In accordance with the present invention, since the clutch current is controlled according to the engine speed, the braking action of the engine may be surely effected at every transmission ratio of the transmission.

What is claimed is:

1. A system for controlling an electro-magnetic clutch for an engine powered car, which has an accelerator pedal, an ignition device for an engine of said car, and a magnetizing coil for coupling said electro-magnetic clutch, comprising an acceleration detecting circuit responsive to the depression of said accelerator pedal for producing an output signal, an engine speed detecting circuit adapted to produce an output signal when the engine speed exceeds a predetermined speed, said output signal being retained until said engine speed falls below a speed different from said predetermined speed, current means for producing an output for increasing the current passing through said magnetizing coil, gate means responsive to outputs of said acceleration detecting circuit and said means for producing a first output for increasing the current passing through said magnetizing coil and further responsive to said output of said engine speed detecting circuit for producing a second output for a rated current of said magnetizing coil, and switch means provided in the circuit of said magnetizing coil and responsive to outputs of said gate means for allowing the current to pass through said magnetizing coil.

2. A system for controlling an electro-magnetic clutch for an engine powered car in accordance with claim 1 wherein said current means is a pulse generating circuit for producing pulses, the pulse separation of which decreases with an increase of the engine speed.

3. A system for controlling an electro-magnetic clutch for an engine powered car in accordance with claim 1, wherein said electro-magnetic clutch is a powder clutch.

4. A system for controlling an electro-magnetic clutch for an engine powered car, which has an accelerator pedal, ignition device for said engine, magnetizing coil for coupling said electro-magnetic clutch, comprising an acceleration detecting circuit responsive to the depression of said accelerator pedal for producing an output signal, an engine speed detecting circuit adapted to produce an output signal when the engine speed exceeds a predetermined speed, means for producing an output for increasing the current passing through said magnetizing coil, said means is a pulse generating circuit for producing pulses, the pulse separation of which decreases with an increase of the engine speed, gate means responsive to outputs of said acceleration detecting circuit and said means for producing a first output for increasing the current passing through said magnetizing coil and further responsive to said output of said engine speed detecting circuit for producing a second output for a rated current of said magnetizing coil, switch means provided in the circuit of said magnetizing coil and responsive to outputs of said gate means for allowing the current to pass through said magnetizing coil, and said switch means is a transistor, which is turned on by said first and second outputs of said gate means.

5. A system for controlling an electro-magnetic clutch for an engine powered car in accordance with claim 4 wherein said gate means comprises an AND gate responsive to outputs of said acceleration detecting circuit and of said pulse generating circuit and an OR gate responsive to the output of said AND gate and to the output of said engine speed detecting circuit for producing an output for turning on said transistor.

6. A system for controlling an electro-magnetic clutch for an engine powered car in accordance with claim 5 wherein said engine speed detecting circuit is adapted to produce a high level output at a first predetermined engine speed in accelerating condition and to produce a low level output at a second predetermined engine speed lower than said first predetermined engine speed in decelerating condition.

7. A system for controlling an electro-magnetic clutch for an engine powered car in accordance with claim 4, wherein said electro-magnetic clutch is a powder clutch.

8. A system for controlling an electro-magnetic clutch for an engine powered car, which has an accelerator pedal, an ignition device for an engine of said car, and a magnetizing coil for coupling said electro-magnetic clutch, said system comprising an acceleration detecting circuit responsive to the depression of said accelerator pedal for producing an output signal, an engine speed detecting circuit means for producing a first output signal having one logic level when the speed of said engine exceeds a first predetermined speed and for producing a second output signal having another logic level when the engine speed decreases below a second predetermined speed lower than the first predetermined speed, a pulse generating circuit means responsive to ignition pulses by said ignition device for producing pulses having a duty factor varying with an increase in the engine speed, a first gate circuit responsive to outputs of said acceleration detecting circuit and to pulses from said pulse generating circuit means for producing output signals, a second gate circuit responsive to said first and second output signals of said engine speed detecting circuit means and to output signals of said first gate circuit for producing output signals, and switch means responsive to said output signals of said second gate circuit for controlling the current passing through said magnetizing coil and responsive to said first output signal for allowing a rated current to pass through the magnetizing coil and responsive to said second output signal to cut off the current for said magnetizing coil.

9. A system for controlling an electro-magnetic clutch for an engine powered car in accordance with claim 8, wherein said first gate circuit comprises an AND gate responsive to outputs of said acceleration detecting circuit means and of said pulse generating circuit means and wherein said second gate circuit comprises an OR gate responsive to the output of said AND gate and to the output of said engine speed detecting circuit means.

10. A system for controlling an electro-magnetic cluch for an engine powered car in accordance with claim 8, wherein said electro-magnetic clutch is a powder clutch.

11. A system for controlling an electro-magnetic clutch for an engine powered car including a magnetizing coil for coupling said electro-magnetic clutch, said system comprising engine speed detecting means for producing a first output signal having one logic level when the speed of said engine exceeds a first predetermined speed and for producing a second output signal having another logic level when the engine speed decreases below a second predetermined speed lower than said first predetermined speed, and means coupled to said engine speed detecting means and for applying current to the magnetizing coil substantially proportional to the speed of said engine for speeds less than said predetermined speeds, said current applying means including means for switching at said first output signal of said engine speed detecting means at speeds higher than said first predetermined speed to apply full clutch engaging current to said magnetizing coil and for maintaining said full clutch engaging current until, and for, switching at said second output signal of said engine speed detecting means at speeds lower than said second predetermined speed to provide for engine braking during deceleration of said engine until the engine speed drops at least to said second predetermined speed.

12. A system for controlling an electro-magnetic clutch for an engine powered car in accordance with claim 11, wherein
said electro-magnetic clutch is a powder clutch.

13. The system for controlling an electro-magnetic clutch for an engine powered car in accordance with claim 11, wherein
said current applying means further includes an acceleration detecting means for blocking current through said magnetizing coil when an accelerator pedal of the car is released at engine speeds at most equal to said second predetermined speed.

14. The system for controlling an electro-magnetic clutch for an engine powered car in accordance with claim 13, further comprising
means comprising an ignition device for producing ignition pulses,
a pulse generating circuit means responsive to said ignition pulses produced by an ignition device for producing control pulses and having a duty factor varying with an increase in the engine speed,
said current applying means for controlling the applying current through said magnetizing coil for engine speeds less than said predetermined speeds via said control pulses.

15. The system for controlling an electro-magnetic clutch for an engine powered car in accordance with claim 14, wherein
said current applying means includes,
an AND gate for receiving said control pulses from said pulse generating circuit means and for receiving signals from said acceleration detecting means,
an OR gate having one input connected to the output of said AND gate and another input connected to the output of said engine speed detecting means, and a transistor having a base connected to the output of said OR gate and an emitter-collector path in series with said magnetizing coil.

16. The system for controlling an electro-magnetic clutch for an engine powered car in accordance with claim 15, wherein
said engine speed detecting means has an input connected to said pulse generating circuit means.

17. The system for controlling an electro-magnetic clutch for an engine powered car in accordance with claim 15, wherein
said engine speed detecting means comprises an integrator and an operational amplifier having a non-inverting input connected to the output of said integrator and a transistor having a base connected to the output of said operational amplifier and an emitter-collector path connected in series with a resistor to the inverting input of said operational amplifier and a voltage divider resistor pair connected to said inverting input.

18. The system for controlling an electro-magnetic clutch for an engine powered car in accordance with claim 11, wherein
said engine speed detecting means comprises an integrator and an operational amplifier having a non-inverting input connected to the output of said integrator and a transistor having a base connected to the output of said operational amplifier and an emitter-collector path connected in series with a resistor to the inverting input of said operational amplifier and a voltage divider resistor pair connected to said inverting input.

* * * * *